UNITED STATES PATENT OFFICE.

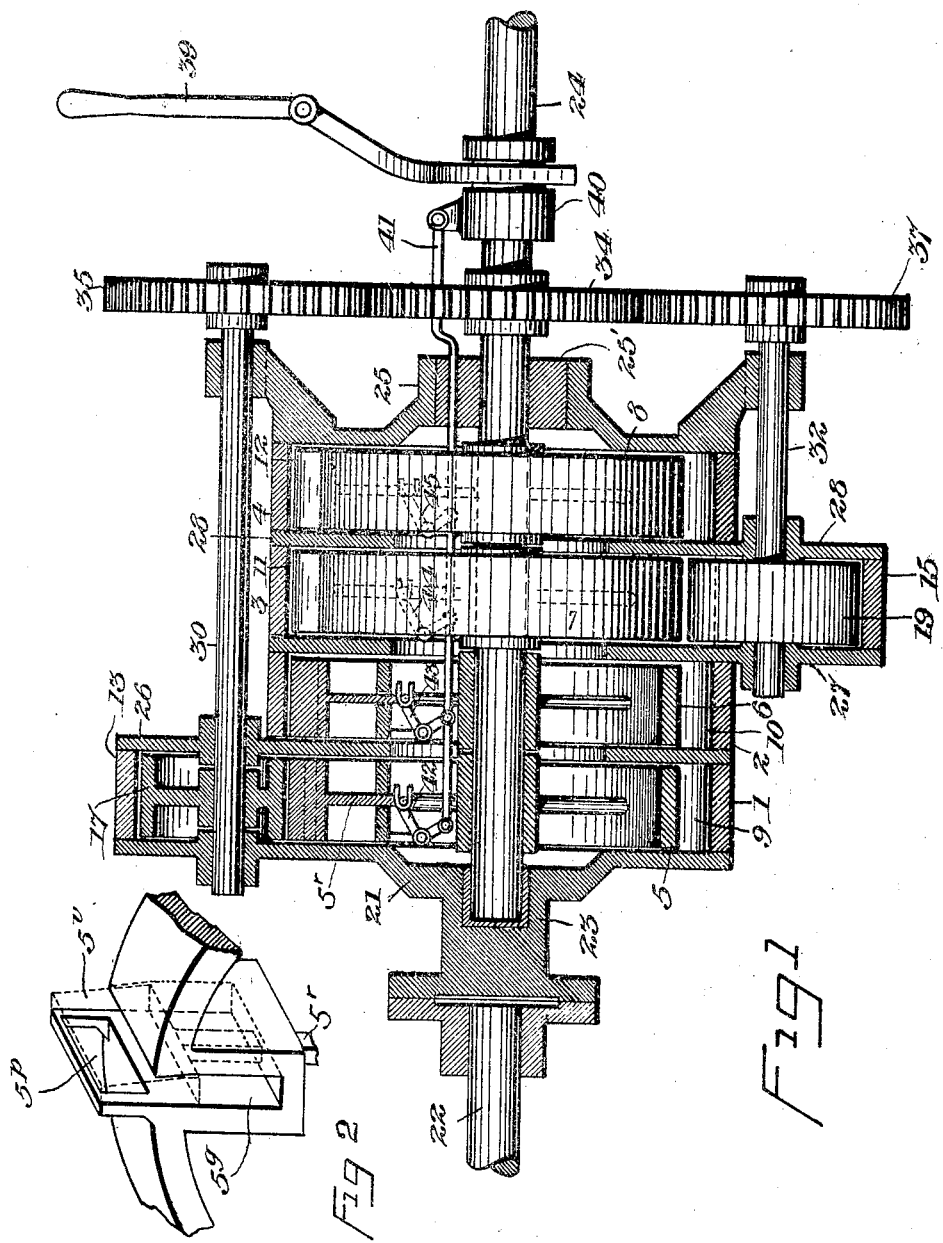

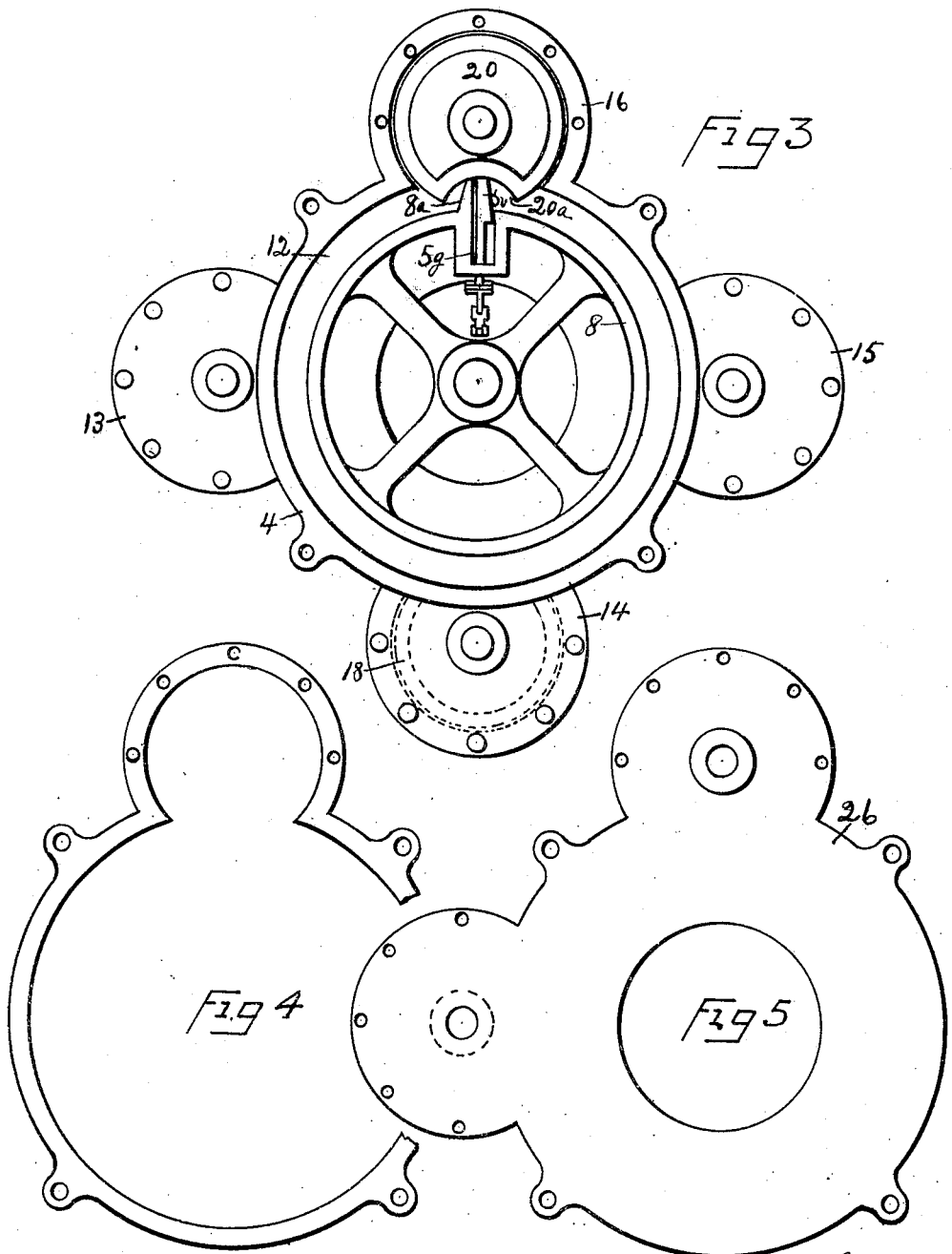

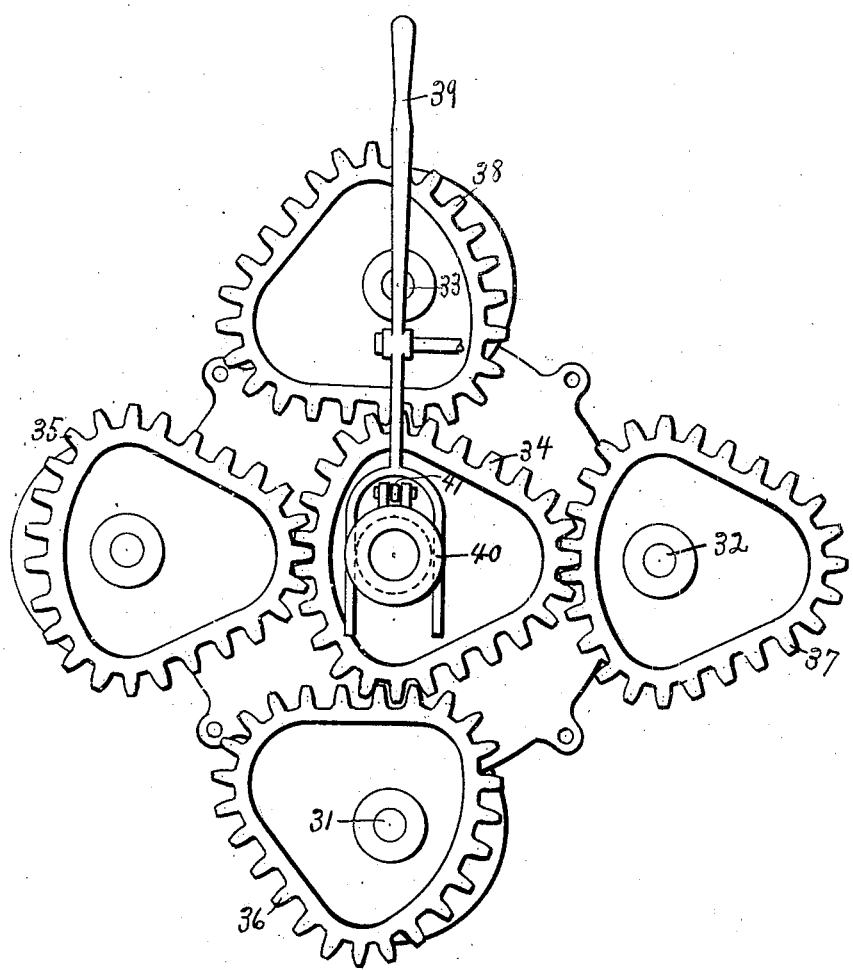

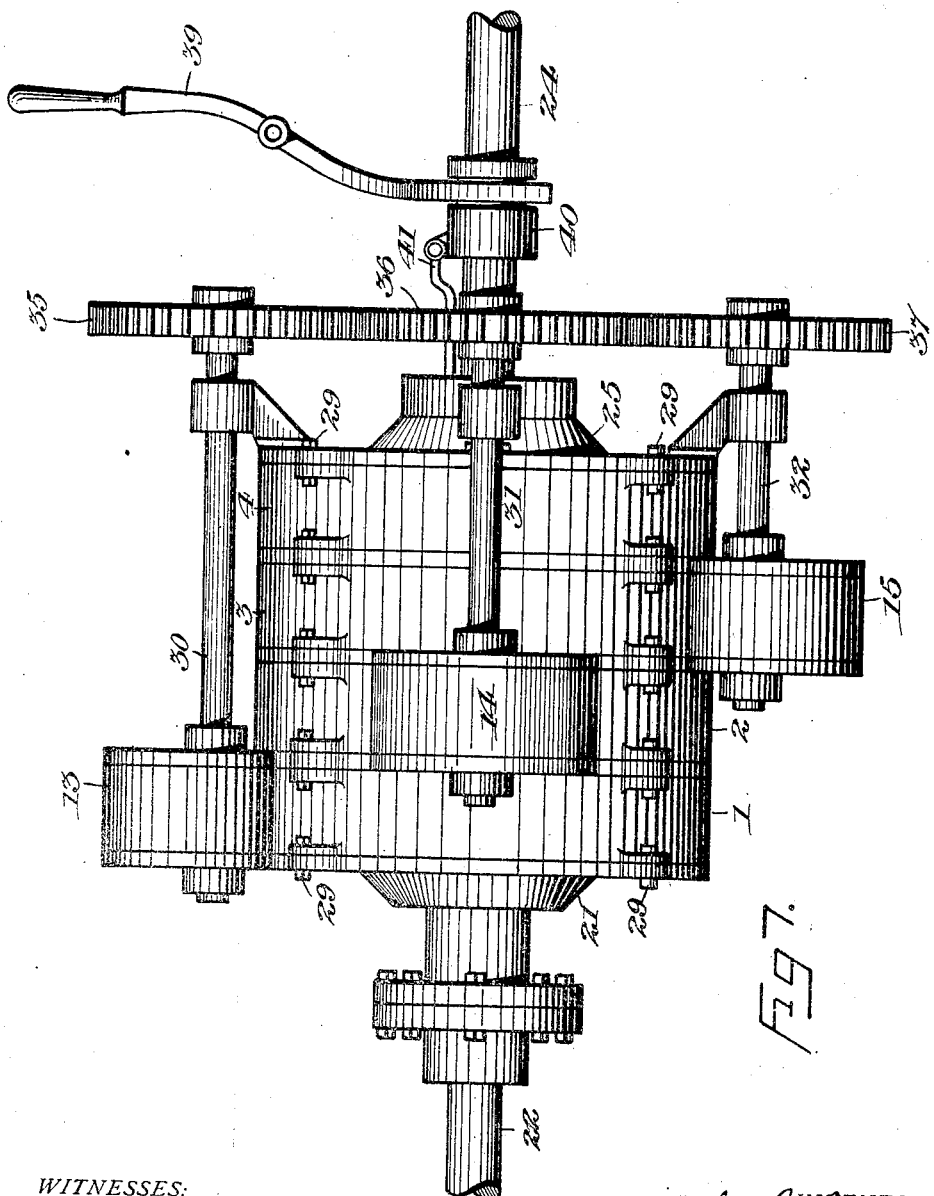

JOHN C. CARPENTER, OF HOUSTON HEIGHTS, TEXAS.

FLUID-CLUTCH.

1,033,048.  Specification of Letters Patent.  Patented July 16, 1912.

Application filed November 14, 1910. Serial No. 592,164.

*To all whom it may concern:*

Be it known that I, JOHN C. CARPENTER, a citizen of the United States, residing at Houston Heights, in the county of Harris and State of Texas, have invented certain new and useful Improvements in Fluid-Clutches, of which the following is a specification.

My invention relates to new and useful improvements in fluid clutches and belongs to that class of power transmission mechanism wherein a cylinder and a piston, having an annular working chamber therebetween, and having a common axis of rotation, each carry abutments normally blocking said working chamber and adapted to compress or expand a working fluid upon the relative rotation of said cylinder and piston.

The object of the invention is to produce a clutch, of the character described, which will possess great power and at the same time be light and durable and capable of being readily declutched and also gradually engaged so as to transmit any part or all of the power of the prime mover without shock or jar and without the frictional loss common to friction clutches.

With the above and other objects in view my invention has particular relation to certain novel features of construction, and operation hereinafter described in this specification and illustrated in the accompanying drawings, which are made a part thereof, wherein:—

Figure 1 is a side elevation of my device with the casing and two of the cylinders, and the working parts thereof, shown in section. Fig. 2 is a perspective view of the valve, and the seat therefor in the piston. Fig. 3 is a plan view of the clutch with the end casing and the operative mechanism removed. Fig. 4 is a partial plan view of the cylinder casing. Fig. 5 is a plan view of one of the partitions separating the cylinders. Fig. 6 is a plan view of the gears for operating the rotary abutments. Fig. 7 is a side elevation of my device.

Referring now more particularly to the drawings, wherein like numerals of reference designate similar parts in each of the figures, a four cylinder mechanism is shown wherein the numerals 1, 2, 3 and 4 designate, respectively, tandem cylinders and the numerals 5, 6, 7, and 8 refer to circular pistons having the same axis of rotation as the said cylinders.

The numerals 9, 10, 11, and 12 refer, respectively, to annular working chambers between the cylinder walls 5 and the periphery of the respective pistons.

The numerals 13, 14, 15, and 16, respectively, refer to cylindrical recesses in the respective cylinders, provided for the purpose of receiving rotary abutments 17, 18, 19 and 20, which are in rolling contact with their respective pistons.

The numeral 21 refers to an end plate to cylinder 1, fixed upon driving shaft 22 and forming a bearing 23 for the driven shaft 24, upon which the pistons are rigidly mounted.

The numeral 25 refers to an end plate of cylinder 4 which is provided with an independently rotatable sleeve 25' which serves as a supporting bearing for the shaft 24.

The cylinders 1 and 2 are separated by the partition 26, and in like manner the cylinders 2 and 3 and 3 and 4 are separated, respectively, by partitions 27 and 28, these partitions separating also, the annular working chambers and the respective pistons operating therein. The cylinders, 1, 2, 3, and 4, end plates 21 and 25, and partitions 26, 27, and 28, form the outer and side walls of the annular working chambers 9, 10, 11 and 12 and are held together by bolts 29. The rotary abutments are each provided with peripheral pockets, all similar, the pocket of abutment 20, being shown in Fig. 3 and designated as 20ª. These pockets are adapted to register with corresponding piston abutments, projecting from the periphery of the respective pistons, the abutment carried by piston 8 being shown in Fig. 3 and designated by the reference character 8ª. These piston abutments contact with the outer and side walls of their respective working chambers, 9, 10, 11 and 12. The rotary abutments 17, 18, 19 and 20 are mounted, respectively, on shafts 30, 31, 32 and 33, which are supported by end plates 21 and 25, and are driven by a master gear 34, which meshes with like gears 35 35, 36, 37 and 38 carried respectively, by shafts 30 31, 32 and 33. These gears are heart shaped, so as to give variable motion to the rotary abutments, the greatest acceleration occurring at the period when the peripheral pockets register with their corresponding piston abutments. By the use of this special form of gear, and the provision for accelerated motion at this point smaller peripheral pockets may be used, than would otherwise be required and there is, consequently, less time for the escapement of the fluid from one side of the rotary abutment to the other.

The pistons are provided with radial grooves, as shown in Figs. 2 and 3, and designated by the reference character 5$^g$, to receive valves 5$^v$ which are adapted to operate radially and block and unblock the annular working chambers. The piston abutments aline with said groove, on one side, and are secured to the pistons in any suitable manner, or may be made integral therewith, and are primarily intended to support and brace their respective valves. These abutments are provided with ports 5$^p$, so as to permit the passage of the working fluid therethrough unless closed by their respective valves. The outer portion of the forward side of the grooves carried by pistons 5, 6, 7, 8 are inclined, slightly, toward their respective valves so that said valves will have a bevel seat and a wedge effect. The valves are operated by means of a lever 39 operating a sleeve 40 sliding on shaft 24 in the usual manner, and operating connecting rod 41 and bell cranks 42, 43 44 and 45, said bell cranks being pivoted on the rotary piston and having one arm of each hinged to said rod 41, and the other arm engaging with a pin projecting from each of the valve stems 5$^r$. These stems 5$^r$, extend inwardly and are integral with their respective valves, and by manipulation of lever 39 a reciprocating motion may be imparted to the valve through the rod 41 and the bell cranks and valve stems just described.

It is readily obvious that the piston abutments may be omitted and the annular working chambers may be blocked and unblocked by means of the valves, in which case a heavy oil may be used as the working fluid. When the valve is withdrawn into the piston the clutch is fully declutched except for the friction of the moving parts with each other and with the oil. When the valve is projected entirely to the cylinder wall, the incompressibility of the oil renders the clutch positive in its clutching effect, slipping only as the oil may be forced past either abutment or past the edge of the pistons. Between these two extremes the clutching effect may be varied at the will of the operator, the clutch transmitting all of the power to the driven member, which is delivered by the driving member.

The rotary abutments on the several cylinders are set 90° apart so that only one cylinder may be under full compression at a time. This style of clutch is designed, especially, for the operation of motor trucks or motor vehicles running on a railroad; for use on automobiles, a single cylinder may be used, having two rotary abutments, rotating three times as fast as which in this case carries three abutment valves, thus permitting gradual engagement of the clutch and the starting of the vehicle without shock.

With the engine running at constant, and most efficient speed, the speed of the vehicle may be varied, by the clutch, throughout the entire range from zero to direct drive from the engine.

Having described my engine and designated its individual parts, I will now describe its principle and mode of operation:— When the engine is running and the driving member is rotating, if the valves are withdrawn into the pistons, the pistons will offer no resistance, except surface friction, to the rotation of the cylinders or the oil carried around with the cylinders by the rotary abutments. When the valve is released by the operation of the lever 39 and forced out beyond the periphery of the piston, this movement of the valve tends to prevent the rotary abutments from carrying the oil around the piston. When the valve contacts with the cylinder wall, the oil trapped between the piston and rotary abutments is compressed until the piston is forced to rotate, by reason of said compression, in harmony with the cylinder. Whenever the resistance of the piston abutments to the rotation of the oil about the pistons exceeds the resistance opposing the traction movement the vehicle will begin to move, and the greater the ratio between piston abutment resistance and traction resistance the greater will be the speed.

What I claim is:

1. In a fluid clutch, the combination with a casing and a rotary piston having an annular working chamber therebetween; of a valve carried by said piston for blocking said annular working chamber; a rotary abutment carried by said casing and normally blocking said annular working chamber but provided with a peripheral pocket to permit the passage of said valve, means for rotating said rotary abutment at such speed relative to said piston as to cause said valve to register with said pocket, and means for operating said valve.

2. In a fluid clutch, the combination with a casing and a rotary piston having an annular working chamber therebetween; of a sliding valve carried by said piston for blocking said annular working chamber; a rotary abutment carried by said casing and normally blocking said annular working chamber but provided with a peripheral pocket to permit the passage of said valve; means for rotating said rotary abutment at such a speed relative to said piston as to cause said valve to register with said pocket, and means for operating said valve.

3. In a fluid clutch the combination with a casing and a rotary piston, having an annular working chamber therebetween; of a sliding valve carried by said piston for blocking said annular working chamber and provided with a seat, a guide for said valve whose operative face is inclined to the seat of the valve; a rotary abutment carried by said casing and normally blocking said annular working chamber and provided with a peripheral pocket to permit the passage of said valve; means for rotating said rotary abutment in proper relation to said piston, and means for operating said valve.

4. In a device of the character described the combination with a casing and a rotary piston, having an annular working chamber therebetween; of a valve carried by said piston and arranged to reciprocate so as to block and unblock said annular working chamber; a rotary abutment carried by said casing and normally blocking said chamber and provided with a peripheral pocket to permit the passage of the valve; means for rotating said rotary abutment at such a speed relative to said piston as to cause said valve to register with said pocket and means for operating said valve.

5. In a device of the character described, the combination with a casing and a rotary piston having an annular working chamber therebetween; of a piston abutment carried by said piston and spanning said chamber and being provided with a port therethrough; a valve carried by said piston and arranged to reciprocate relative to said abutment and close and open the port thereof and thereby block and unblock said chamber; a rotary abutment carried by said casing and normally blocking said chamber but provided with a peripheral pocket arranged to register with said piston abutment and permit the passage thereof around said chamber; means for rotating said rotary abutment at such a speed relative to said piston as to cause said piston abutment to register with said peripheral pocket and means for operating said valve.

6. In a device of the character described the combination with a casing and a rotary piston having an annular working chamber therebetween; of a piston abutment carried by said piston and spanning said working chamber said piston member being provided with a port leading from one side to the other of the piston abutment; a valve carried by said piston and arranged to open and close said port; a rotary abutment carried by said casing and normally blocking said working chamber and being provided with a peripheral pocket to permit the passage of the piston abutment; a means for rotating said rotary abutment variably, relative to said piston, said means being so arranged as to accelerate the movement of said rotary abutment during the passage of said piston abutment through said pocket, and means for operating said valve.

7. In a fluid clutch, the combination with a casing and a rotary piston having an annular working chamber therebetween; of a valve carried by one of said members, adapted to block and unblock said chamber; a rotary abutment, carried by the other of said members, and normally blocking said chamber and provided with a peripheral pocket to permit the passage of the valve; means for rotating said rotary abutment, relative to the valve-carrying member so as to cause said valve and pocket to register and means for operating said valve.

8. A fluid clutch including two relatively rotatable members having an annular working chamber therebetween; a means carried by one of said members, adapted to block and unblock said working chamber; a rotary abutment, carried by the other of said members, and normally blocking said working chamber and provided with a peripheral pocket to permit the passage of said blocking and unblocking means; means for rotating said rotary abutment in such a manner as to cause said pocket to register with said blocking and unblocking means.

9. A fluid clutch including two relatively rotatable members having an annular working chamber therebetween; a valve carried by one of said members adapted to block and unblock said chamber; a rotary abutment, carried by the other of said members, and normally blocking said chamber and provided with a peripheral pocket to permit the passage of said valve, and a system of gears operatively connected with said rotary abutment and so arranged as to impart variable motion thereto and to accelerate the motion thereof during the passage of said valve through said pocket.

10. In a device of the character described the combination with a casing and a rotary piston, having an annular working chamber therebetween; of a valve carried by said piston and arranged to reciprocate so as to block and unblock said annular working chamber; an abutment carried by said casing and normally blocking said chamber, and adapted to permit the passage of said valve, and means for operating said valve.

11. In a fluid clutch, the combination with a casing and a rotary piston having an annular working chamber therebetween; of an abutment carried by one of said members and spanning said working chamber, said member being provided with a port leading from one side to the other of the abutment; a valve carried by said member and arranged to open and close said port; a rotary abutment carried by the other of said members and normally blocking said working chamber and being provided with a peripheral pocket to permit the passage of the first mentioned abutment; means for rotating said rotary abutment, relative to the first mentioned member so as to cause said first mentioned abutment and said peripheral pocket to register; and means for operating said valve.

12. In a fluid clutch, the combination with two relatively rotatable members, having a working chamber therebetween; of a sliding valve carried by one of said members and arranged to block and unblock said working chamber; a rotary abutment carried by the other of said members and normally blocking said working chamber, and provided with a peripheral pocket to permit the passage of said valve; means for rotating said rotary abutment relative to the valve-carrying member so as to cause said valve and pocket to register; and a means for regulating the operation of said valve.

13. In a fluid clutch, the combination with two relatively rotatable members, having a working chamber therebetween; one of said members being provided with a slot; of a valve sliding in said slot and arranged to block and unblock said working chamber; a rotary abutment carried by the other of said members and normally blocking said working chamber, and provided with a peripheral pocket to permit the passage of said valve; means for rotating said rotary abutment relative to the valve-carrying member so as to cause said valve and pocket to register; and a means for regulating the operation of said valve.

14. In a fluid clutch, the combination with two relatively rotatable members, having a working chamber therebetween, one of said members being provided with a radial slot; of a valve sliding in said slot and arranged to block and unblock said working chamber; a rotary abutment carried by the other of said members and normally blocking said working chamber, and provided with a peripheral pocket to permit the passage of said valve; means for rotating said rotary abutment relative to the valve-carrying member, so as to cause said valve and pocket to register; and a means for regulating the operation of said valve.

15. In a fluid clutch, the combination with two relatively rotatable members, having a working chamber therebetween, one of said members being provided with a radial slot; of a valve sliding radially in said slot and arranged to block and unblock said working chamber; a rotary abutment carried by the other of said members and normally blocking said working chamber, and provided with a peripheral pocket to permit the passage of said valve; means for rotating said rotary abutment relative to the valve-carrying member so as to cause said valve and pocket to register; and a means for regulating the operation of said valve.

16. In a fluid clutch, the combination with two relatively rotatable members, having a working chamber therebetween, one of said members being provided with a slot; of a valve sliding in said slot and arranged to block and unblock said working chamber; a valve actuating means operatively connected thereto and actuating said valve at an angle to the path of movement of said valve actuating means; a rotary abutment carried by the other of said members and normally blocking said working chamber and provided with a peripheral pocket to permit the passage of said valve; means for rotating said rotary abutment relative to the valve carrying member, so as to cause said valve and pocket to register; and a means for regulating the operation of said valve actuating means.

In testimony whereof I have signed my name to this specification in the presence of two subscribing witnesses.

JOHN C. CARPENTER.

Witnesses:
J. W. YEAGLEY,
A. TOMPKINS.